United States Patent
Park et al.

(10) Patent No.: US 11,341,365 B2
(45) Date of Patent: May 24, 2022

(54) METHOD AND APPARATUS WITH AUTHENTICATION AND NEURAL NETWORK TRAINING

(71) Applicant: Samsung Electronics Co., Ltd., Suwon-si (KR)

(72) Inventors: Seong-Jin Park, Suwon-si (KR); Insoo Kim, Seongnam-si (KR); Seungju Han, Seoul (KR); Jiwon Baek, Hwaseong-si (KR); Ju Hwan Song, Suwon-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 16/913,205

(22) Filed: Jun. 26, 2020

(65) Prior Publication Data

US 2021/0166071 A1 Jun. 3, 2021

(30) Foreign Application Priority Data

Dec. 3, 2019 (KR) ........................ 10-2019-0159328

(51) Int. Cl.
*G06K 9/62* (2022.01)
*G06N 3/04* (2006.01)
*G06N 3/08* (2006.01)

(52) U.S. Cl.
CPC .......... *G06K 9/6256* (2013.01); *G06K 9/628* (2013.01); *G06K 9/6262* (2013.01); *G06N 3/0454* (2013.01); *G06N 3/08* (2013.01)

(58) Field of Classification Search
CPC combination set(s) only.
See application file for complete search history.

(56) References Cited

U.S. PATENT DOCUMENTS 8,712,156 B2  4/2014  Bronstein et al.
9,224,071 B2  12/2015 Tu et al.
(Continued)

FOREIGN PATENT DOCUMENTS

JP      4039224 B2    1/2008
KR  10-1433472 B1    8/2014
(Continued)

OTHER PUBLICATIONS

Weiyang Liu, "SphereFace: Deep Hypersphere Embedding for Face Recognitionn",Jul. 2017, Proceedings of the IEEE Conference on Computer Vision and Pattern Recognition (CVPR), pp. 212-217.*
(Continued)

*Primary Examiner* — Omar S Ismail
(74) *Attorney, Agent, or Firm* — NSIP Law

(57) ABSTRACT

A processor-implemented neural network method includes: determining, using a neural network, a feature vector based on a training image of a first class among a plurality of classes; determining, using the neural network, plural feature angles between the feature vector and class vectors of other classes among the plurality of classes; determining a margin based on a class angle between a first class vector of the first class and a second class vector of a second class, among the class vectors, and a feature angle between the feature vector and the first class vector; determining a loss value using a loss function including an angle with the margin applied to the feature angle and the plural feature angles; and training the neural network by updating, based on the loss value, either one or both of one or more parameters of the neural network and one or more of the class vectors.

15 Claims, 11 Drawing Sheets

(56) References Cited

U.S. PATENT DOCUMENTS

| | | | |
|---|---|---|---|
| 2018/0173955 A1 | 6/2018 | Mehrseresht | |
| 2019/0138860 A1* | 5/2019 | Liu | G06K 9/66 |
| 2020/0042687 A1* | 2/2020 | Choi | G06F 21/32 |
| 2020/0342214 A1* | 10/2020 | Li | G06K 9/6232 |

FOREIGN PATENT DOCUMENTS

| | | |
|---|---|---|
| KR | 10-2016-0101973 A | 8/2016 |
| KR | 10-2018-0173859 A | 12/2018 |
| KR | 10-2020-0083119 A | 7/2020 |

OTHER PUBLICATIONS

Feng Wang, "Additive Margin Softmax for Face Verification", Apr. 4, 2018, IEEE Signal Processing Letters, vol. 25, No. 7, Jul. 2018, pp. 936-929.*

Mansoor Iqbal, "A deep learning approach for face recognition based on angularly discriminative features," Oct. 3, 2019, Pattern Recognition Letters 128 (2019), pp. 414-419.*

Hao Liu, "AdaptiveFace: Adaptive Margin and Sampling for Face Recognition," Jun. 2019, Proceedings of the IEEE/CVF Conference on Computer Vision and Pattern Recognition (CVPR), 2019, pp. 11947-11954.*

Hao Wang, "CosFace: Large Margin Cosine Loss for Deep Face Recognition," Jun. 2018, Proceedings of the IEEE Conference on Computer Vision and Pattern Recognition (CVPR), 2018, pp. 5265-5272.*

Wang, Hao et al., "CosFace: Large Margin Cosine Loss for Deep Face Recognition", *2018 IEEE/CVF Conference on Computer Vision and Pattern Recognition*, 2018 (pp. 1-11).

Deng, Jiankang, et al. "Arcface: Additive Angular Margin Loss for Deep Face Recognition", *2019 IEEE/CVF Conference on Computer Vision and Pattern Recognition (CVPR)*, 2019 (pp. 1-11).

* cited by examiner

METHOD AND APPARATUS WITH AUTHENTICATION AND NEURAL NETWORK TRAINING

CROSS-REFERENCE TO RELATED APPLICATIONS

This application claims the benefit under 35 USC § 119(a) of Korean Patent Application No. 10-2019-0159328, filed on Dec. 3, 2019, in the Korean Intellectual Property Office, the entire disclosure of which is incorporated herein by reference for all purposes.

BACKGROUND

1. Field

The following description relates to a method and apparatus with authentication and neural network training.

2. Description of Related Art

In neural network models, nodes (e.g., artificial neurons) may be connected by connection lines to form a network. Signals input to a node of the network through respective connection lines from outputs of pervious nodes in the network may be summed and activation processed in the node of the network. Each node may have a unique state value and attribute value. The activation of the node may be provided as an input to one or more subsequent nodes through respective subsequent connection lines. Each of connection lines between nodes may also have respective unique state values and attribute values and functions to control an intensity of a signal transferred by another connection line. A state value of a connection line may be a weight value indicative of a connection strength of the particular connection line. A state value may refer to a value that changes during calculation after the value is initially set. An attribute value may refer to a value that remains unchanged once the value is set.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural network method includes: determining, using a neural network, a feature vector based on a training image of a first class among a plurality of classes; determining, using the neural network, plural feature angles between the feature vector and class vectors of other classes among the plurality of classes; determining a margin based on a class angle between a first class vector of the first class and a second class vector of a second class, among the class vectors, and a feature angle between the feature vector and the first class vector; determining a loss value using a loss function including an angle with the margin applied to the feature angle and the plural feature angles; and training the neural network by updating, based on the loss value, either one or both of one or more parameters of the neural network and one or more of the class vectors.

The determining of the margin may include determining, as the margin, a ratio of a difference between the class angle and the feature angle to the class angle.

The loss function may include a ratio of an exponential value of the angle with the margin applied to the feature angle to a sum of the exponential value and a sum of exponential values of the plural feature angles.

The exponential value may include an exponential value of a trigonometric value of the angle with the margin applied to the feature angle.

The loss function may include a softmax cross entropy function.

The training of the neural network by the updating may include updating the either one or both of the one or more parameters of the neural network and the one or more of the class vectors such that the loss value is reduced.

The training of the neural network by the updating may include updating the either one or both of the one or more parameters of the neural network and the one or more of the class vectors such that the feature angle is reduced and the class angle is increased.

The second class vector may have a smallest angle difference with the first class vector among the class vectors of the other classes.

A non-transitory computer-readable storage medium may store instructions that, when executed by a processor, configure the processor to perform the method.

In another general aspect, a processor-implemented neural network method includes: determining, using a trained neural network, an input feature vector based on an input image of a user; comparing the input feature vector to an enrolled feature vector of an enrolled image determined using the trained neural network; and authenticating the user based on a result of the comparing, wherein a feature vector is determined, using the neural network, based on a training image of a first class among a plurality of classes, plural feature angles between the feature vector and class vectors of other classes among the plurality of classes are determined using the neural network, a margin is determined based on a class angle between a first class vector of the first class and a second class vector of a second class, among the class vectors, and a feature angle between the feature vector and the first class vector, and the neural network is trained by updating either one or both of one or more parameters of the neural network and one or more of the class vectors based on a loss value determined using a loss function including an angle with the margin applied to the feature angle and the plural feature angles.

The comparing of the input feature vector to the enrolled feature vector may include calculating an inner product between the input feature vector and the enrolled feature vector, and the authenticating of the user may include authenticating the user based on the inner product.

The method may include capturing the input image of the user using an image sensor.

In another general aspect, a processor-implemented neural network method includes: determining, using a trained first neural network, an intermediate input feature vector and a final input feature vector based on an input image of a user; and determining, using a trained second neural network, a confidence of the input image based on the intermediate input feature vector and the final input feature vector, wherein an intermediate training feature vector and a final training feature vector are determined, using the first neural network, based on a training image of a first class among a plurality of classes, plural feature angles between the final training feature vector and class vectors of other classes among the plurality of classes are determined using the first neural network, a margin is determined based on a class angle between a first class vector of the first class and a second class vector of a second class, among the class vectors, and a feature angle between the final feature vector and the first class vector, a confidence of the training image is determined, using the second neural network, based on the margin, the intermediate training feature vector, and one or more of the class vectors, and the first neural network and the second neural network are trained based on a loss value determined using a loss function including an angle with the margin applied to the feature angle and the plural feature angles.

In another general aspect, a processor-implemented neural network method includes: determining, using a neural network, a feature vector of a training image of a first class among classes; determining, using the neural network, a feature angle between the feature vector and a first class vector of the first class; determining a class angle between the first class vector and a second class vector of a second class; determining a margin based on a ratio of a difference between the class angle and the feature angle to the class angle; determining a loss value based on the feature angle and the margin; and training the neural network by updating, based on the loss value, one or more of the class vectors.

In another general aspect, a neural network apparatus includes: one or more processors configured to: determine, using a trained neural network, an input feature vector based on an input image of a user; compare the input feature vector to an enrolled feature vector of an enrolled image determined using the trained neural network; and authenticate the user based on a result of the comparing, wherein a feature vector is determined, using the neural network, based on a training image of a first class among a plurality of classes, plural feature angles between the feature vector and class vectors of other classes among the plurality of classes are determined using the neural network, a margin is determined based on a class angle between a first class vector of the first class and a second class vector of a second class, among the class vectors, and a feature angle between the feature vector and the first class vector, and the neural network is trained by updating either one or both of one or more parameters of the neural network and one or more of the class vectors based on a loss value determined using a loss function including an angle with the margin applied to the feature angle and the plural feature angles.

Other features and aspects will be apparent from the following detailed description, the drawings, and the claims.

Figure 1:
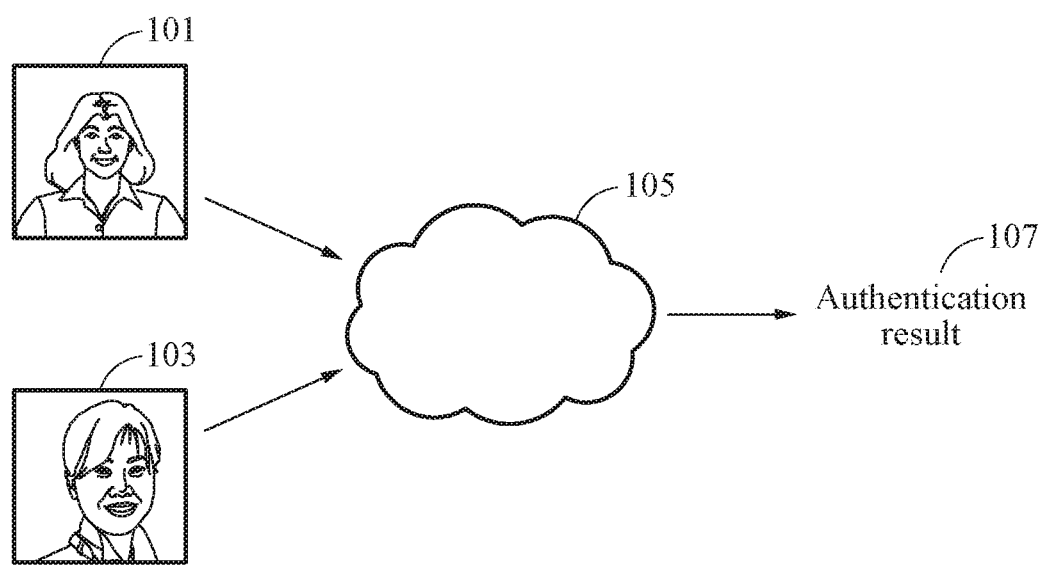
FIG. 1 illustrates an example of an authentication of a user based on an input image of the user using an authentication apparatus trained based on a training method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

As used herein, the singular forms are intended to include the plural forms as well, unless the context clearly indicates otherwise. The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Hereinafter, examples will be described in detail with reference to the accompanying drawings, and like reference numerals in the drawings refer to like elements throughout.

FIG. 1 illustrates an example of an authentication of a user based on an input image of the user using an authentication apparatus trained based on a training method.

Referring to FIG. 1, an authentication apparatus 105 may receive, obtain, or capture an input image 103 of a user using an image sensor (e.g., an image sensor 1302 of FIG. 13, discussed below) and authenticate the user based on the input image 103. The authentication apparatus 105 may compare an enrolled image 101 to the input image 103 to authenticate the user. The authentication apparatus 105 may use a neural network to authenticate the user based on the input image 103. The authentication apparatus 105 may extract and enroll a feature of an enrolled image, extract a feature of the input image 103, and compare the feature of the input image 103 to the feature of the enrolled image to authenticate the user. The authentication apparatus 105 may output an authentication result 107 of the user. A feature of an image (e.g., the extracted and/or enrolled feature of the enrolled image 101 or the extracted feature of the input image 103) may be in a form of a vector. In the following description, a "feature vector" may refer to a feature of an image or a result of feature extraction or filtering.

A neural network included in the authentication apparatus 105 may be trained by a training apparatus. The training apparatus may train the neural network to determine a class of input training data as a correct answer class to which the training data belongs. The training apparatus may train the neural network to enhance a discrimination between a plurality of classes. The authentication apparatus 105 may include the training apparatus, or the training apparatus may be external to the authentication apparatus 105, according to non-limiting examples.

In an example, the neural network may include a feature extractor, a classifier, a margin calculator, and a loss value calculator. The feature extractor, the classifier, the margin calculator and the loss value calculator may each include at least one layer of the neural network. The feature extractor, the classifier, the margin calculator and the loss value calculator may be included in a single neural network, or may be configured as separate components (e.g., as separate neural networks). The classifier may include a plurality of neural network layers corresponding to a plurality of classes. A parameter of a layer corresponding to each class may form a vector. For example, a vector of each class may be formed based on respective parameters of each corresponding layer. The formed vector of a layer corresponding to each class may be referred to as a "class vector".

In an example, the neural network may include a feature extractor, a classifier, a margin calculator, a loss value calculator, and a confidence calculator. The feature extractor, the classifier, the margin calculator, the loss value calculator, and the confidence calculator may each include at least one layer of the neural network. The feature extractor, the classifier, the margin calculator, the loss value calculator and the confidence calculator may be included in a single neural network, or may be configured as separate components (e.g., as separate neural networks). The classifier may include a plurality of layers corresponding to a plurality of classes. A parameter of a layer corresponding to each class may be represented as a class vector.

The training apparatus may train the neural network to determine a class of input training data as a correct answer class to which the training data belongs. The training apparatus may train the neural network such that a feature vector of a training image is similar to a class vector of a class to which the training image belongs. The training apparatus may train the neural network to enhance a discrimination between a plurality of classes. The training apparatus may train the neural network to enhance a difference between class vectors of a plurality of classes.

The training apparatus may train parameters of the neural network and/or a class vector corresponding to each of a plurality of classes. In an example, the training apparatus may update a plurality of class vectors and parameters of layers included in each of the feature extractor and classifier, based on a training result. In another example, the training apparatus may update a plurality of class vectors and parameters of layers included in each of the feature extractor, the classifier, and the confidence calculator, based on a training result.

The training apparatus may calculate a loss value using a loss function. The loss function may be used to calculate a loss value based on a similarity between a feature vector and a class vector. The loss function may be used to calculate a loss value based on a similarity between a feature vector and a class vector of a correct answer class, and a similarity between class vectors of each of a plurality of classes. In the following description, the correct answer class may be referred to as a "first class," the class vector of the correct answer class may be referred to as a "first class vector," one of plural classes other than the correct answer class may be referred to as a "second class," and a class vector of the second class may be referred to as a "second class vector".

When an accuracy of a prediction of a class to which a training image belongs by a neural network increases, a loss value of a loss function may decrease. When a similarity between a feature vector and the first class vector is determined to increase by the neural network, a loss value output from the loss function may decrease. When a difference between different class vectors is determined to increase by the neural network, the loss value output from the loss function may decrease.

As a non-limiting example, similarity between vectors may be represented by, or determined based on, an inner product between vectors. When an inner product between two vectors increases, a similarity between the two vectors may be determined to increase. When the inner product between the two vectors decreases, the similarity between the two vectors may be determined to decrease. When an inner product between the feature vector and the first class vector increases, the loss value output from the loss function may decrease. When an inner product between different class vectors increases, the loss value output from the loss function may decrease.

As a non-limiting example, similarity between vectors may be represented by, or determined based on, an angle between vectors. When an angle between two vectors decreases, a similarity between the two vectors may be determined to increase. When the angle between the two vectors increases, the similarity between the two vectors may be determined to decrease. When an angle between the feature vector and the first class vector decreases, the loss value output from the loss function may decrease. When an angle between different class vectors decreases, the loss value output from the loss function may decrease. In the following description, an angle between the feature vector and the first class vector may be referred to as a "feature angle" and the angle between different class vectors may be referred to as a "class angle".

For example, the loss function may include a term representing a difference between the feature vector and the first class vector, and a term representing a difference between the feature vector and one or more of class vectors other than the first class vector (e.g., each of class vectors other than the first class vector). The term representing the difference between the feature vector and the first class vector may be referred to as a "correct answer term" and the term representing the difference between the feature vector and the one or more of the class vectors other than the first class vector may be referred to as an "incorrect answer term". The loss function may include a ratio of the correct answer term to a sum of the correct answer term and the incorrect answer term.

The correct answer term may include an exponential value of a feature angle for the first class. For example, the correct answer term may include an exponential value of an exponent that is a trigonometric function value of the feature angle for the first class. The incorrect answer term may include an exponential value of a feature angle for another class. For example, the incorrect answer term may include an exponential value of an exponent that is a trigonometric function value of the feature angle for the other class.

As a non-limiting example, the loss function may include, for example, a softmax cross entropy function. The training apparatus may output a classification result of inputs of a plurality of classes using the softmax cross entropy function.

The training apparatus may train the neural network based on a variable margin. The training apparatus may adaptively train the neural network based on the variable margin. The training apparatus may apply a margin to the loss function. The training apparatus may apply the margin to a correct answer term of the loss function. The training apparatus may apply the margin to a trigonometric function of the correct answer term of the loss function. The training apparatus may enhance a discrimination power of the loss function based on the margin.

In an example, the training apparatus may apply the margin to a feature angle of the trigonometric function of the correct answer term of the loss function. In this example, the training apparatus may multiply the margin by the feature angle of the trigonometric function of the correct answer term of the loss function. The training apparatus may add the margin to the feature angle of the trigonometric function of the correct answer term of the loss function.

In another example, the training apparatus may apply the margin to a value of the trigonometric function of the correct answer term of the loss function. In an example, the training apparatus may subtract the margin from the value of the trigonometric function of the correct answer term of the loss function.

$$-\frac{1}{N}\sum_{i=1}^{N} \log \frac{e^{s(\cos(a\theta_{y_i}+b)-c)}}{e^{s(\cos(a\theta_{y_i}+b)-c)} + \sum_{j=1, j\neq y_i}^{n} e^{s\cos\theta_j}} \quad \text{Equation 1}$$

For example, the training apparatus may use a loss function shown in Equation 1 above. Equation 1 is in a form in which a margin is applied to a softmax cross entropy function. In Equation 1, a denotes a sphereface margin, b denotes an arcface margin, and c denotes a cosface margin. Also, a, b, and c may be selectively applied.

In Equation 1, $e^{s(\cos(a\theta_{y_i}'+b)-c)}$ corresponds to a correct answer term representing the difference between the feature vector and the first class vector, and $\tau_{j=1, j\neq y_i}^{n} e^{s\cos\theta_j}$ corresponds to an incorrect answer term representing a difference between the feature vector and another class vector. Accordingly, the loss function of Equation 1 includes a ratio of the correct answer term to a sum of the correct answer term and the incorrect answer term. In Equation 1, the correct answer term includes an exponential value of a feature angle $\theta_{y_i}'$ for a first class $y_i$. In Equation 1, the correct answer term includes an exponential value of an exponent that is a trigonometric function (e.g., cos) value of the feature angle $\theta_{y_i}'$ for the first class $y_i$. In Equation 1, the incorrect answer term includes an exponential value of an angle, for example, $\theta_j$, for one of classes other than the first class $y_i$. In Equation 1, the incorrect answer term includes an exponential value of an exponent that is a trigonometric function (e.g., cos) value of the feature angle for the other class.

Based on Equation 1, the training apparatus may apply a margin to the correct answer term of the loss function. The training apparatus may apply the margin to a trigonometric function of the correct answer term of the loss function. The training apparatus may apply the margin to a feature angle of the trigonometric function of the correct answer term of the loss function. For example, the training apparatus may multiply the sphereface margin a of Equation 1 by the feature angle of the trigonometric function of the correct answer term of the loss function. The training apparatus may add the arcface margin b of Equation 1 to the feature angle of the trigonometric function of the correct answer term of the loss function. In an example, the training apparatus applies the margin to a value of the trigonometric function of the correct answer term of the loss function. For example, the training apparatus may subtract the cosface margin c of Equation 1 from the value of the trigonometric function of the correct answer term of the loss function. In an example, based on Equation 1, the training apparatus may multiply the sphereface margin a by the feature angle $\theta_{y_i}'$, add the arcface margin b to the result of the multiplying, determine a trigonometric function value of the result of the adding, and subtract the cosface margin c from the trigonometric function value.

The training apparatus may apply the margin to further enhance a discrimination ability of the neural network and an ability of the neural network to predict a correct answer. The training apparatus may calculate, as a margin, a ratio of a difference between a class angle and a feature angle to the class angle. When the feature angle decreases and when the class angle increases, the margin may increase. A relatively small feature angle may indicate a relatively high similarity between a feature vector of an input image and the first class vector of the first class that is a correct answer class, and may indicate that a class to which the input image belongs is correctly predicted. A relatively large class angle may indicate a relatively high discrimination ability between different classes. In an example, one or more (or all) of the sphereface margin a, the arcface margin b, and the cosface margin c may be determined as, determined based on, and/or proportional to the ratio of the difference between the class angle and the feature angle to the class angle.

A performance of the neural network may be degraded due to the margin, and therefore the training apparatus may more effectively train the neural network using the margin (e.g., may train the neural network to be more accurate). For example, when an angle in the trigonometric function of the correct answer term (e.g., $a\theta_{y_i}'+b$) increases due to the margin, a weight of the correct answer term may decrease and a loss value of the loss function may increase. Thus, the training apparatus may more excessively train the neural network (e.g., through increased iterations) due to the presence of the margin in the loss function, and a training effect may advantageously increase in comparison to when such a margin is absent from the loss function. When the performance of the neural network increases while the neural network is being trained (e.g., when determined feature angles iteratively decrease while the neural network is being trained), the margin may be determined to increase and a training result of the neural network may be further enhanced. Accordingly, one or more embodiments of the present disclosure may improve the technological field of neural networks by training a neural network by applying the margin to the loss function (e.g., as applied in Equation 1 above), thereby improving the accuracy of the trained neural network over typical trained neural networks.

Figure 2:
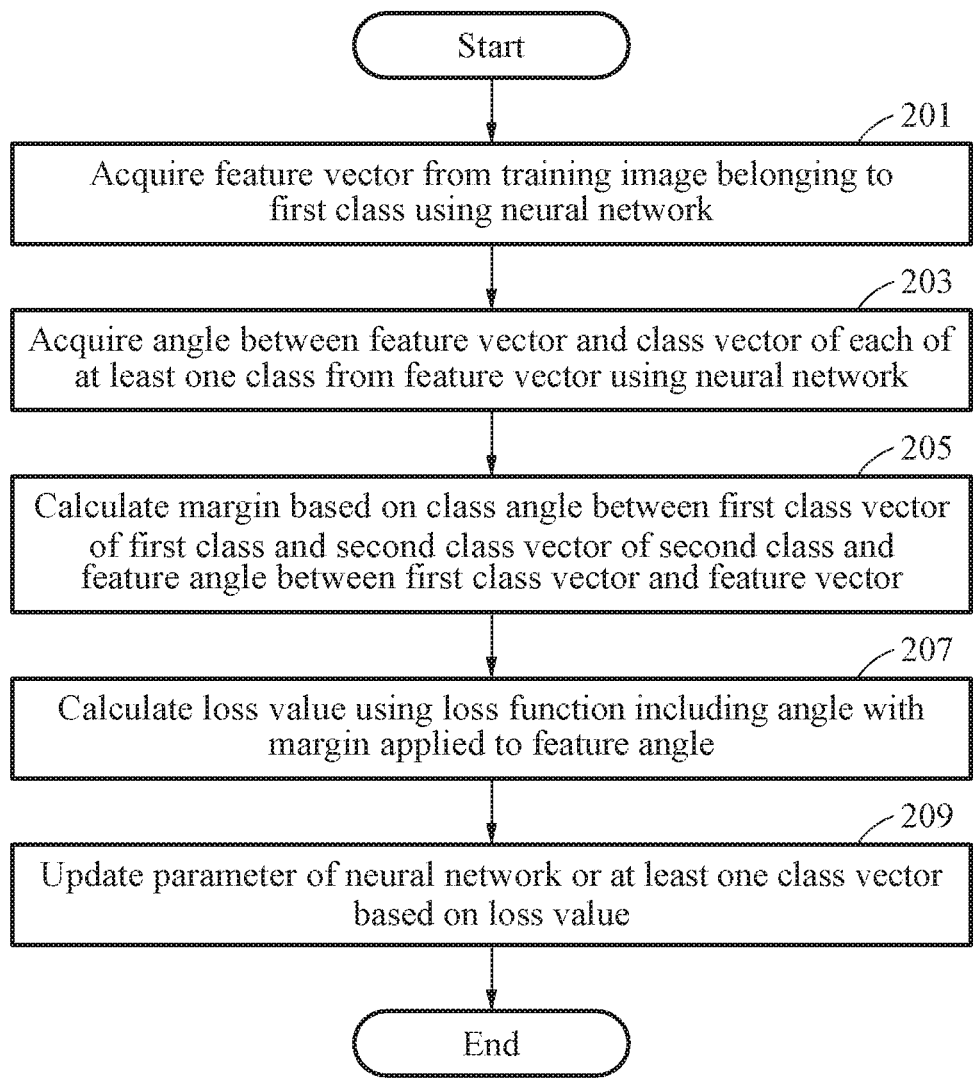
FIG. 2 illustrates an example of a training method.

Referring to FIG. 2, in operation 201, a training apparatus may acquire or determine a feature vector from a training image belonging to a first class (e.g., a correct answer class) using a neural network. The neural network may include a feature extractor, a classifier, a margin calculator, and a loss value calculator. The feature extractor, the classifier, the margin calculator, and the loss value calculator may each include at least one layer of the neural network.

In operation 203, the training apparatus may acquire or determine an angle between the feature vector and a class vector of each of at least one class from the feature vector using the neural network.

In operation 205, the training apparatus may calculate a margin based on a class angle between a first class vector of the first class and a second class vector of a second class and a feature angle between the first class vector and the feature vector. The second class vector may be, for example, a class vector that has a smallest angle difference with the first class vector among at least one class vector.

The training apparatus may calculate, as a margin, a ratio of a difference between the class angle and the feature angle to the class angle. When the feature angle decreases and when the class angle increases, the margin may increase.

In operation 207, the training apparatus may calculate a loss value using a loss function that includes an angle with the margin applied to the feature angle. A performance of the neural network is may be degraded due to the margin, and therefore the training apparatus may more effectively train the neural network using the margin (e.g., may train the neural network to be more accurate). Accordingly, the training apparatus may more excessively train the neural network, and thus a training effect may further increase in comparison to when a margin is absent. When the performance of the neural network increases while the neural network is being trained, the margin may increase and a training result of the neural network may be further enhanced.

The loss function may include a ratio of an exponential value of a feature angle for the first class to a sum of the exponential value of the feature angle for the first class and a sum of exponential values of feature angles for classes other than the first class. The loss function may include, for example, a softmax cross entropy function.

In operation 209, the training apparatus may update parameters of the neural network or at least one class vector based on the loss value. For example, the training apparatus may update the parameters of the neural network or the at least one class vector to reduce the loss value (e.g., upon further training). Also, the training apparatus may update the parameters of the neural network or the at least one class vector to reduce the feature angle and to increase the class angle.

Figure 3:
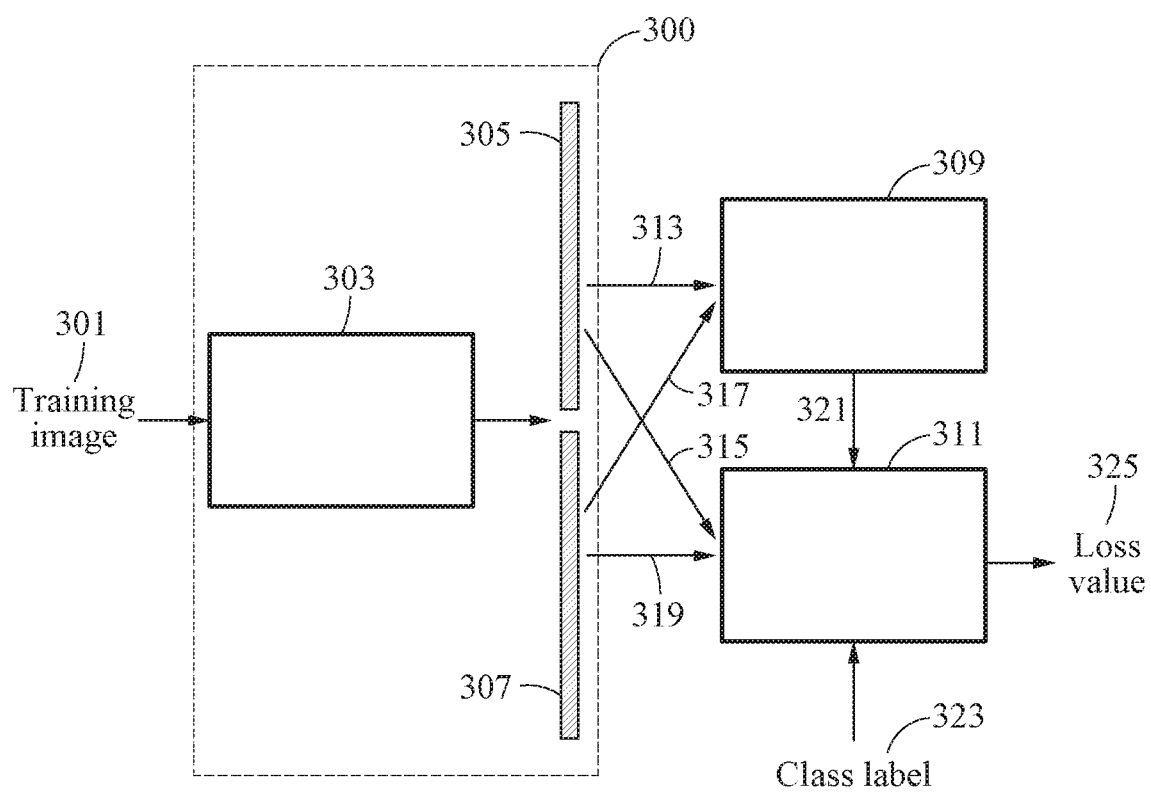
FIG. 3 illustrates an example of a neural network of a training apparatus.

FIG. 3 illustrates an example of a neural network of a training apparatus.

Referring to FIG. 3, the training apparatus may include a preceding layer 303, a feature extractor 305, a classifier 307, a margin calculator 309, and a loss value calculator 311. The feature extractor 305, the classifier 307, the margin calculator 309, and the loss value calculator 311 may each include at least one layer of the neural network. The preceding layer 303, the feature extractor 305, the classifier 307, the margin calculator 309, and the loss value calculator 311 may be included in a single neural network, or may be configured as one or more or all separate components.

The classifier 307 may include a plurality of layers corresponding to a plurality of classes. A parameter of a layer corresponding to each class may form a vector. For example, a vector of each class may be formed based on respective parameters of each corresponding layer. The formed vector of a layer corresponding to each class may be referred to as a "class vector".

The training apparatus may receive, as an input, a training image 301. The training image 301 may be input to the preceding layer 303. The preceding layer 303 may output a vector determined based on, and in response to the input of, the training image 301. The vector may be input to the feature extractor 305. The feature extractor 305 may output a feature vector (e.g., feature vector 313) determined based on the vector. Feature vectors 313 and 319 may be transferred to the margin calculator 309 and the loss value calculator 311, respectively.

In an example, a feature vector may be transferred to the classifier 307. In another example, the vector output from the preceding layer 303 may be transferred to the classifier 307. The classifier 307 may output a classification result of the feature vector. Classification results 315 and 317 may be transferred to the loss value calculator 311 and the margin calculator 309, respectively.

The margin calculator 309 may calculate a margin 321 based on the feature vector 313 and the classification result 317. The training apparatus may calculate a margin based on a class angle between a first class vector of a first class and a second class vector of a second class and a feature angle between the first class vector and a feature vector (e.g., the feature vector 313). For example, the training apparatus may calculate, as a margin, a ratio of a difference between the class angle and the feature angle to the class angle.

The loss value calculator 311 may calculate a loss value 325 based on the feature vector 319, the classification result 315, a class label 323, and the margin 321. The class label 323 may be a correct answer. The training apparatus may calculates a loss value using a loss function that includes an angle with a margin applied to a feature angle. The loss function may include a ratio of an exponential value of a feature angle for the first class to a sum of the exponential value of the feature angle for the first class and a sum of exponential values of feature angles for classes other than the first class. The margin may gradually increase in response to the progress of iterative training, and the training may be more easily performed. The training apparatus may further enhance an effect of the training by determining and applying an appropriate margin for each class and training data.

FIGS. 4A-4D illustrate examples of classes discriminated by loss functions according to related arts.

Figure 4A:
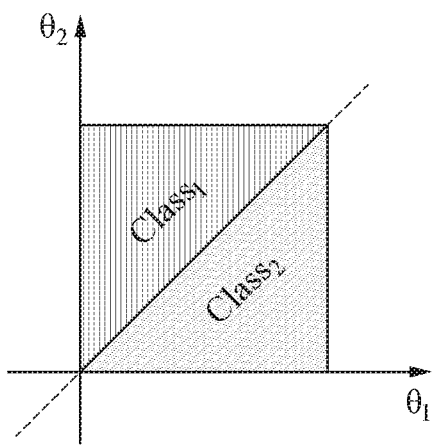
FIGS. 4A-4D illustrate examples of classes discriminated by loss functions according to related arts.

FIG. 4A illustrates $Class_1$ and $Class_2$ discriminated by a loss function to which a margin is not applied. $Class_1$ and $Class_2$ are discriminated based on a predetermined boundary without a separation of angles.

Figure 4B:
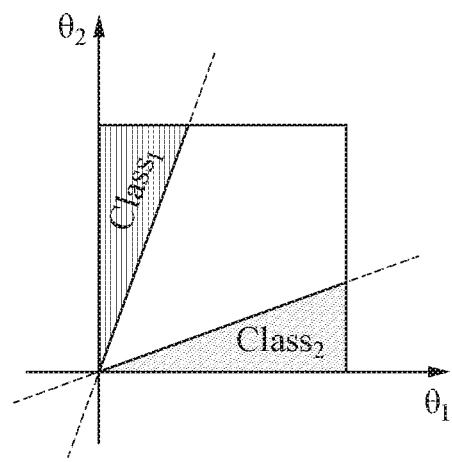

FIG. 4B illustrates $Class_1$ and $Class_2$ discriminated by a fixed sphereface margin. $Class_1$ and $Class_2$ are discriminated based on two fixed boundaries having reserved areas.

Figure 4C:
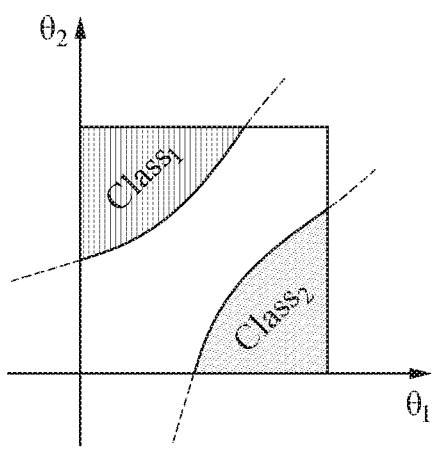

FIG. 4C illustrates $Class_1$ and $Class_2$ discriminated by a fixed arcface margin. $Class_1$ and $Class_2$ are discriminated based on two fixed boundaries having reserved areas.

Figure 4D:
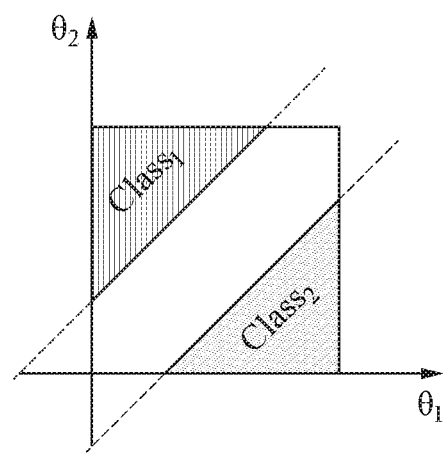

FIG. 4D illustrates $Class_1$ and $Class_2$ discriminated by a fixed cosface margin. $Class_1$ and $Class_2$ are discriminated based on two fixed boundaries having reserved areas.

When a fixed margin is applied as shown in any of FIGS. 4B through 4D, there is a technical problem in that a typical neural network training method or apparatus determines a margin separately through a preceding process of a large quantity of training data. In an example in which the typical neural network training method or apparatus applies the fixed margin as shown in any of FIGS. 4B through 4D, when a margin is incorrectly determined, there are technical problems in that a Not-a-Number (NaN) loss may occur during training, or a loss may not converge. Further, there is an additional technical problem in that an additional technology such as annealing may be required to solve the above technical problems. That is, since the typical neural network training method or apparatus may determine a margin irrespective of a class and training data, the typical neural network training method apparatus may not perform an optimal or optimized training.

Figure 5A:
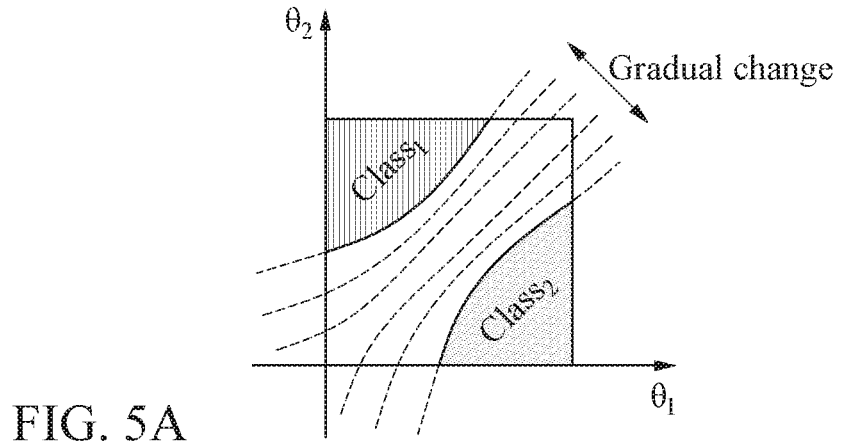
FIGS. 5A-5C illustrate examples of classes discriminated by loss functions.
Figure 5B:
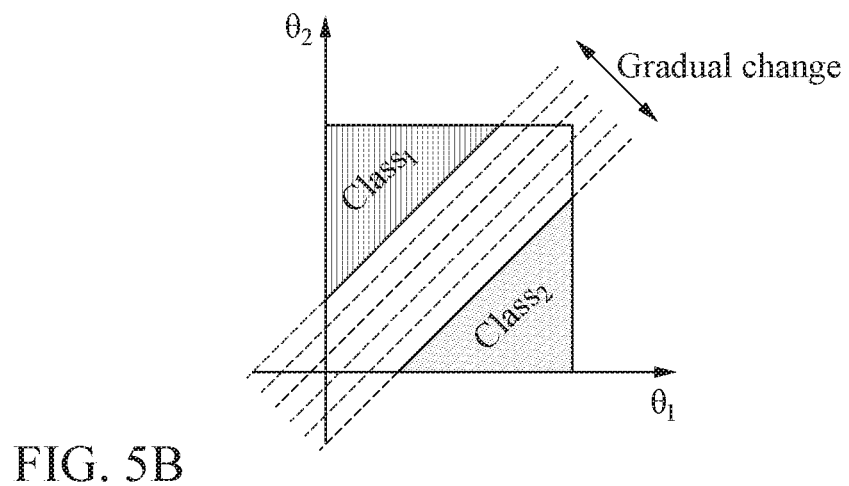
Figure 5C:
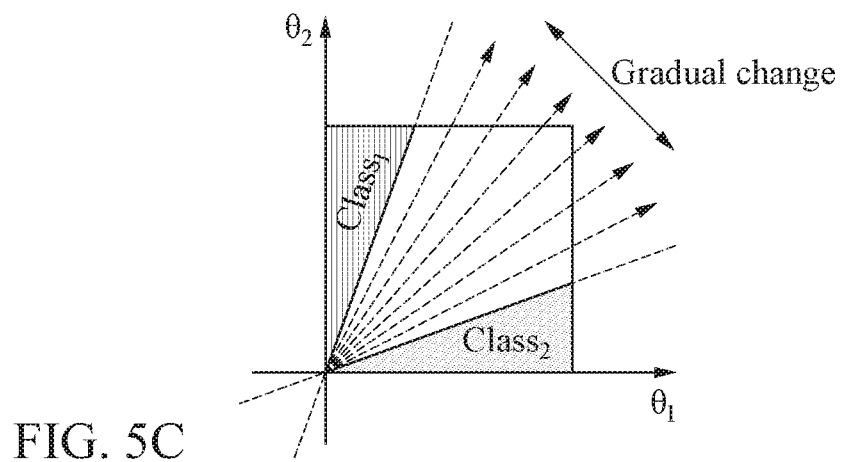

FIGS. 5A-5C illustrate examples of classes discriminated by loss functions.

FIG. 5A illustrates $Class_1$ and $Class_2$ discriminated by a loss function to which a sphereface margin (e.g., the sphereface margin a of Equation 1 above) is applied. A margin may gradually change in response to the iterative progress of training. When a performance of a neural network increases while the neural network is being trained, the margin may increase and a training result of the neural network may be further enhanced.

FIG. 5B illustrates $Class_1$ and $Class_2$ discriminated by a loss function to which an arcface margin (e.g., the arcface margin b of Equation 1 above) is applied. A margin may gradually change in response to the iterative progress of training. When a performance of a neural network increases while the neural network is being trained, the margin may increase and a training result of the neural network may be further enhanced.

FIG. 5C illustrates $Class_1$ and $Class_2$ discriminated by a loss function to which a cosface margin (e.g., the cosface margin c of Equation 1 above) is applied. A margin may gradually change in response to the iterative progress of training. When a performance of a neural network increases while the neural network is being trained, the margin may increase and a training result of the neural network may be further enhanced.

Figure 6A:
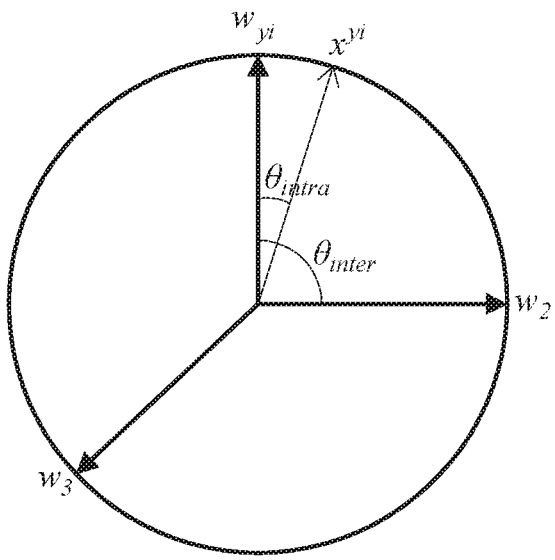
FIG. 6A illustrates an example of parameters trained by a loss function to which a margin is not applied.
Figure 6B:
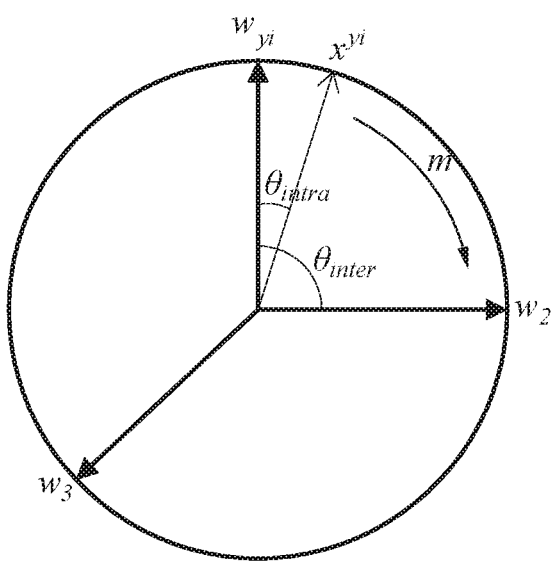
FIG. 6B illustrates an example of parameters trained by a loss function to which a margin is applied.

FIG. 6A illustrates an example of parameters trained by a loss function to which a margin is not applied. FIG. 6B illustrates an example of parameters trained by a loss function to which a margin is applied.

$$-\frac{1}{N}\sum_{i=1}^{N}\log\frac{e^{s(\cos(\theta_{y_i}+m))}}{e^{s(\cos(\theta_{y_i}+m))}+\sum_{j=1,j\neq y_i}^{n}e^{s\cos\theta_j}} \quad \text{Equation 2}$$

$$m = \max(\theta_{inter} - \theta_{intra}, 0)/\theta_{inter} \quad \text{Equation 3}$$

$$\theta_{intra} = \arccos(w_{y_i}^T x^{y_i}) \quad \text{Equation 4}$$

$$\theta_{inter} = \arccos(\max_{j\neq y_i} w_{y_i}^T w_j) \quad \text{Equation 5}$$

A training apparatus of one or more embodiments may apply a margin to further enhance a discrimination ability of a neural network and an ability of the neural network to predict a correct answer. For example, the training apparatus may use a loss function of Equation 2 above. Equation 2 corresponds to a loss function using a sphereface margin (e.g., the sphereface margin a from the above Equation 1). The training apparatus may calculate a margin m based on a class angle $\theta_{inter}$ between a first class vector $w_{y_i}$ of a first class and a second class vector of a second class, and a feature angle $\theta_{intra}$ between the first class vector $w_{y_i}$ and a feature vector $x^{y_i}$ according to the above Equation 3, for example. The second class vector $w_2$ may be, for example, a class vector that has a smallest angle difference with the first class vector $w_{y_i}$ among at least one class vector.

The class angle $\theta_{inter}$ may be calculated using Equation 5, for example. An angle having a cosine value that is an inner product between the first class vector $w_{y_i}$ and a j-th class vector $w_j$ of a j-th class may be determined as the class angle $\theta_{inter}$. The feature angle $\theta_{intra}$ may be calculated using the above Equation 4, for example. An angle having a cosine value that is an inner product between the first class vector $w_{y_i}$ and the feature vector $x^{y_i}$ may be the feature angle $\theta_{intra}$.

The training apparatus may calculate, as a margin, a ratio of a difference between the class angle and the feature angle to the class angle. For example, the training apparatus may calculate, as the margin m, a ratio of a difference between the class angle $\theta_{inter}$ and the feature angle $\theta_{intra}$ to the class angle $\theta_{inter}$ based on the above Equation 3, for example. Referring to Equation 3, when the feature angle decreases and when the class angle increases, the margin may increase. A relatively small feature angle may indicate a relatively high similarity between a feature vector of an input image and a first class vector of a first class that is a correct answer class, and may indicate that a class to which the input image belongs is correctly predicted. A relatively large class angle may indicate a relatively high discrimination ability between different classes.

A performance of the neural network may be degraded due to the margin, and therefore the training apparatus may more effectively train the neural network using the margin (e.g., may train the neural network to be more accurate). When an angle in a trigonometric function of a correct answer term of the above Equation 2 increases due to the margin, a weight of the correct answer term may decrease and a loss value of the loss function may increase. Thus, the training apparatus may more excessively train the neural network due to the presence of the margin in the loss function, and a training effect may advantageously increase in comparison to when a margin is absent from the loss function. When the performance of the neural network increases while the neural network is being trained, the margin may be determined to increase and a training result of the neural network may be further enhanced.

Figure 7:
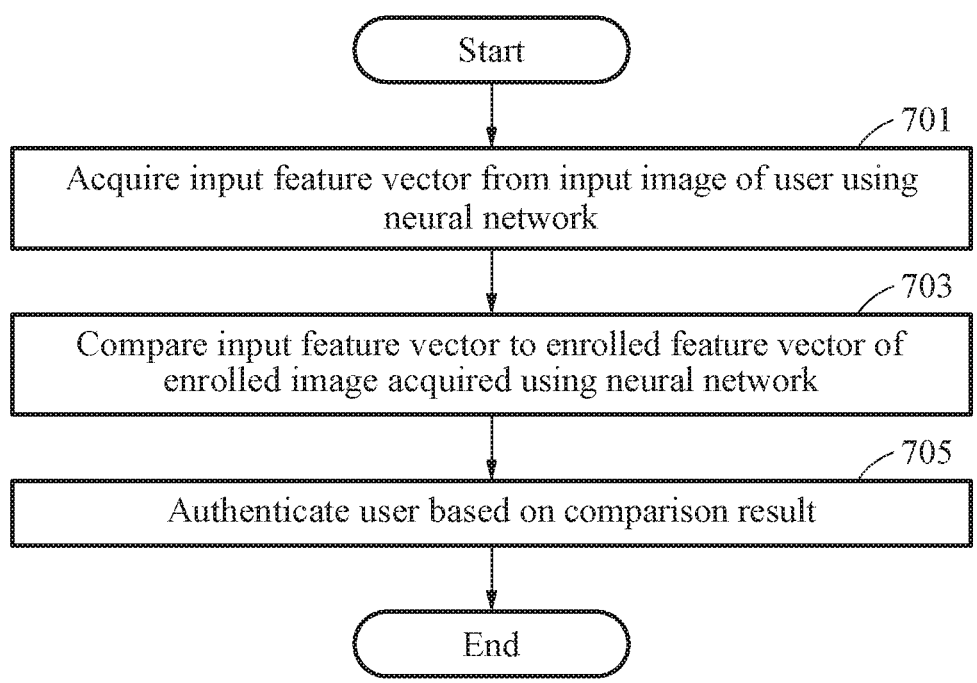
FIG. 7 illustrates an example of an authentication method.

FIG. 7 illustrates an example of an authentication method.

Referring to FIG. 7, in operation 701, an authentication apparatus may acquire an input feature vector from an input image of a user using a neural network. In operation 703, the authentication apparatus may compare the input feature vector to an enrolled feature vector of an enrolled image acquired using the neural network. For example, the authentication apparatus may calculate an inner product between the input feature vector and the enrolled feature vector. In operation 705, the authentication apparatus may authenticate the user based on a comparison result. For example, the authentication apparatus may authenticate the user based on the inner product.

In an example, a feature vector may be acquired from a training image belonging to a first class by the neural network. An angle between the feature vector and a class vector of each of at least one class may be acquired from the feature vector by the neural network. A margin may be calculated based on a class angle between a first class vector of the first class and a second class vector of a second class and a feature angle between the first class vector and the feature vector. Parameters of the neural network or at least one class vector may be trained based on a loss value calculated using a loss function that includes an angle with the margin applied to the feature angle.

Figure 8:
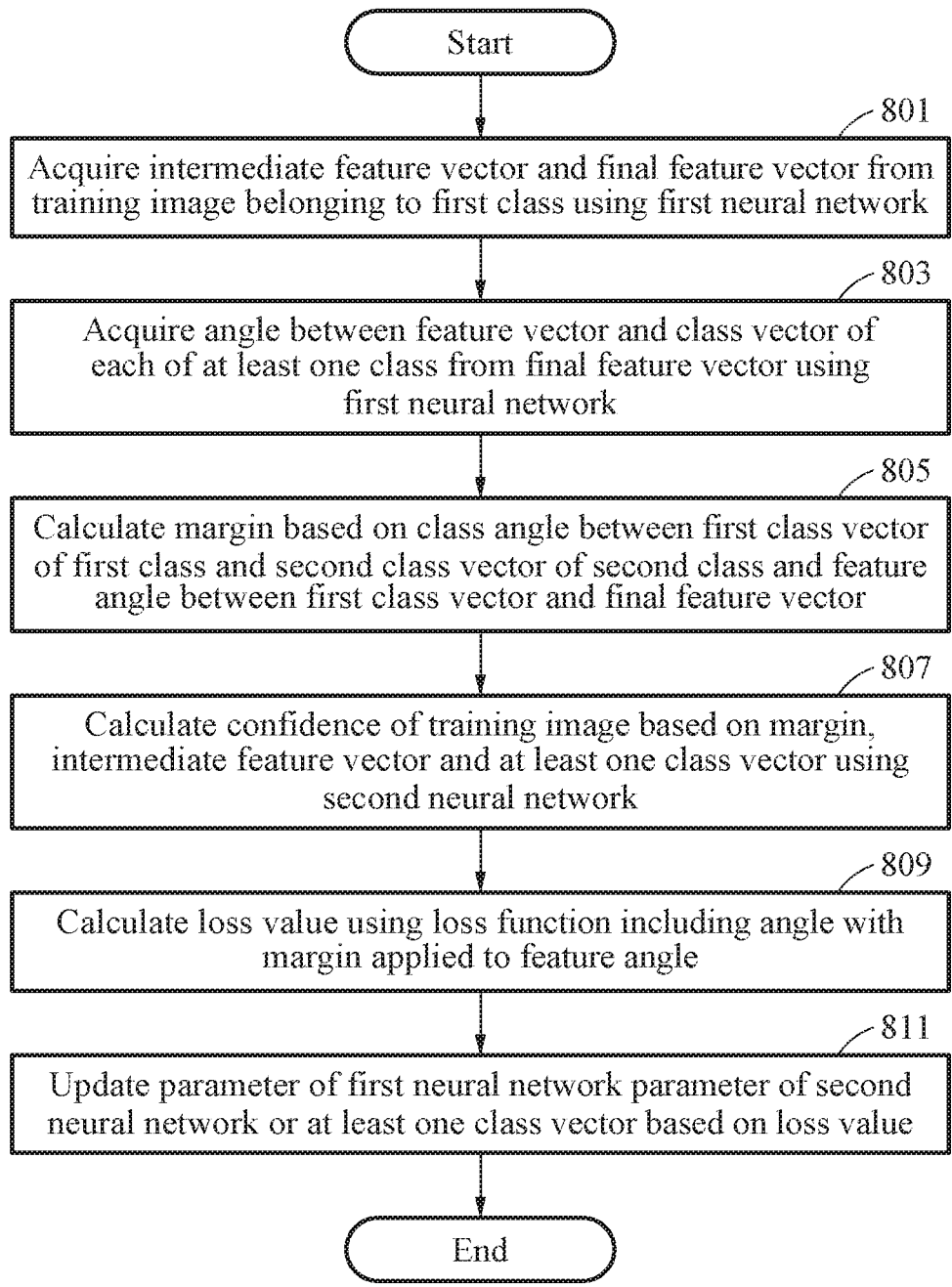
FIG. 8 illustrates an example of a training method.

FIG. 8 illustrates an example of a training method.

Referring to FIG. 8, in operation 801, a training apparatus may acquire an intermediate feature vector and a final feature vector from a training image belonging to a first class using a first neural network. The first neural network may include a feature extractor, a classifier, a margin calculator, and a loss value calculator.

In operation 803, the training apparatus may acquire an angle between the final feature vector and a class vector of each of at least one class from the final feature vector using the first neural network.

In operation 805, the training apparatus may calculate a margin based on a class angle between a first class vector of the first class and a second class vector of a second class and a feature angle between the first class vector and the final feature vector. The second class vector may be, for example, a class vector that has a smallest angle difference with the first class vector among at least one class vector.

The training apparatus may calculate, as a margin, a ratio of a difference between the class angle and the feature angle to the class angle. For example, the training apparatus may calculate a margin using the above Equation 3, for example. When the feature angle decreases and when the class angle increases, the margin may increase.

In operation 807, the training apparatus may calculate a confidence of the training image based on the margin, the intermediate feature vector and at least one class vector using a second neural network. The second neural network may include a feature extractor, a classifier, a margin calculator, a loss value calculator, and a confidence calculator. The feature extractor, the classifier, the margin calculator, the loss value calculator, and the confidence calculator may each include at least one layer of the second neural network. The first neural network and the second neural network may be combined in a single network, or may be provided as separate components (e.g., as separate neural networks).

In operation 809, the training apparatus may calculate a loss value using a loss function that includes an angle with the margin applied to the feature angle. A performance of the neural network may be degraded due to the margin, and therefore the training apparatus may more effectively train the neural network using the margin (e.g., may train the neural network to be more accurate). Thus, the training apparatus may more excessively train the neural network, and a training effect may further increase in comparison to when a margin is absent. When the performance of the neural network increases while the neural network is being trained, the margin may increase and a training result of the neural network may be further enhanced.

In operation 811, the training apparatus may update, based on the loss value, a parameter of the first neural network, a parameter of the second neural network, or the at least one class vector. For example, the training apparatus may update the parameter of the first neural network, the parameter of the second neural network, or the at least one class vector to reduce the loss value. The training apparatus may update the parameter of the first neural network, the parameter of the second neural network, or the at least one class vector to reduce the feature angle and to increase the class angle.

Figure 9:
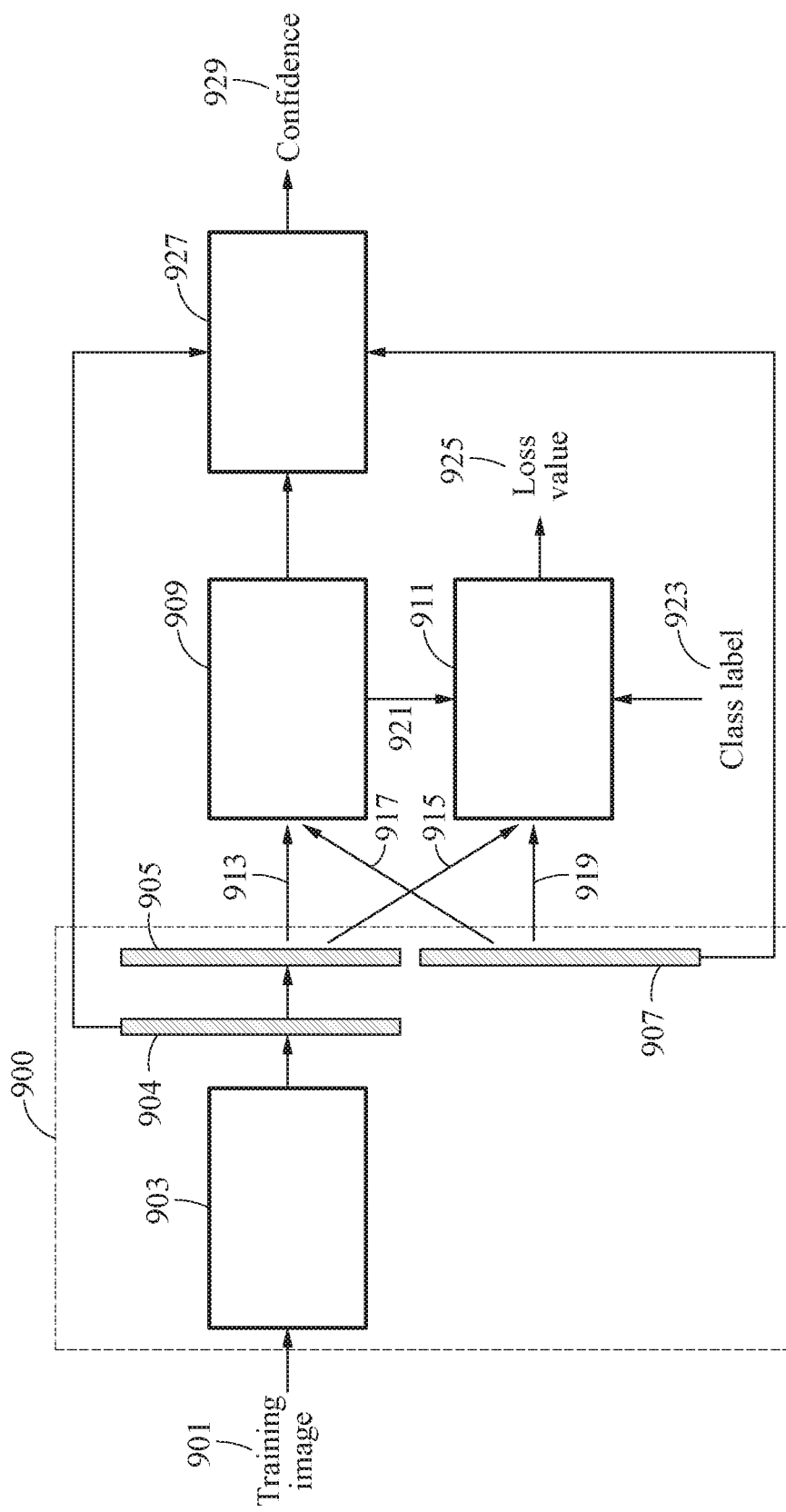
FIG. 9 illustrates an example of a neural network of a training apparatus.

FIG. 9 illustrates an example of a neural network of a training apparatus.

Referring to FIG. 9, the neural network may include a preceding layer 903, an intermediate layer 904, a feature extractor 905, a classifier 907, a margin calculator 909, a loss value calculator 911, and a confidence calculator 927. The intermediate layer 904, the feature extractor 905, the classifier 907, the margin calculator 909, the loss value calculator 911, and the confidence calculator 927 may each include at least one layer of the neural network. The preceding layer 903, the intermediate layer 904, the feature extractor 905, the classifier 907, the margin calculator 909, the loss value calculator 911, and the confidence calculator 927 may be included in a single neural network, or may be configured as two or more or all separate components. The classifier 907 may include a plurality of layers corresponding to a plurality of classes. A parameter of a layer corresponding to each class may form a vector. For example, a vector of each class may be formed based on respective parameters of each corresponding layer.

The training apparatus may receive, as an input, a training image 901. The training image 901 may be input to the preceding layer 903. The preceding layer 903 may output a vector determined based on, and in response to an input of, the training image 901. The vector may be input to the intermediate layer 904. The intermediate layer 904 may output an intermediate vector. The intermediate vector may reflect a large number of characteristics of an image in comparison to a feature vector. For example, the intermediate vector may reflect a quality of an image, noise of the image, an angle at which a user is captured, and/or a size of the image in comparison to the feature vector. The intermediate vector may be input to the feature extractor 905. The feature extractor 905 may output a feature vector (e.g., feature vector 913) determined based on the intermediate vector. Feature vectors 913 and 919 may be transferred to the margin calculator 909 and the loss value calculator 911, respectively. A feature vector (e.g., the feature vector 913) may accurately represent a unique feature of a user in comparison to the intermediate vector. The feature vector may be less sensitive to a quality of an image, noise of the image, an angle at which a user is captured, and/or a size of the image than the intermediate vector.

In an example, a feature vector may be transferred to the classifier 907. In another example, the vector output from the preceding layer 903 may be transferred to the classifier 307. The classifier 907 may output a classification result of the feature vector. Classification result 915 and 917 may be transferred to the loss value calculator 911 and the margin calculator 909, respectively.

The margin calculator 909 may calculate a margin 921 based on the feature vector 913 and the classification result 917. The training apparatus may calculate a margin based on a class angle between a first class vector of a first class and a second class vector of a second class and a feature angle between the first class vector and a feature vector (e.g., the feature vector 913). For example, the training apparatus may calculate, as a margin, a ratio of a difference between the class angle and the feature angle to the class angle.

The loss value calculator 911 may calculate a loss value 925 based on the feature vector 919, the classification result 915, a class label 923, and the margin 921. The class label 923 may be a correct answer. The training apparatus may calculate a loss value using a loss function that includes an angle with a margin applied to a feature angle. The loss function may include a ratio of an exponential value of a feature angle for the first class to a sum of the exponential value of the feature angle for the first class and a sum of exponential values of feature angles for classes other than the first class.

The confidence calculator 927 may receive the margin 921, the classification result 915, and the intermediate vector. The confidence calculator 927 may calculate a confidence 929 based on the margin 921, the classification result 915, and the intermediate vector. The confidence 929 may be an index indicating a degree of confidence of a result output from the training image 901. The confidence 929 may vary depending on a size or an angle of a subject reflected in the intermediate vector, and/or a quality of an image. For example, when a subject is captured at an unusual angle, when the subject is small in size, and/or when an image has a poor quality, a relatively low confidence may be calculated. The confidence calculator 927 may output the confidence 929 of the training image 901.

Figure 10:
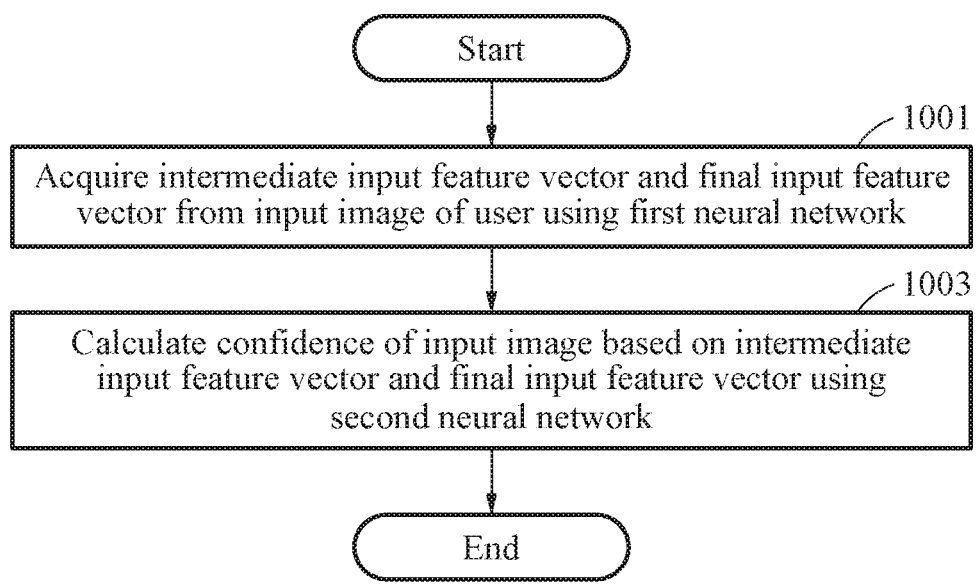
FIG. 10 illustrates an example of an authentication method.

FIG. 10 illustrates an example of an authentication method.

Referring to FIG. 10, in operation 1001, an authentication apparatus may acquire an intermediate input feature vector and a final input feature vector from an input image of a user using a first neural network.

In operation 1003, the authentication apparatus may calculate a confidence of the input image based on the intermediate input feature vector and the final input feature vector using a second neural network.

In an example, the authentication apparatus may authenticate a user based on a selected input image.

In an example, an intermediate feature vector and a final feature vector may be acquired from a training image belonging to a first class by the first neural network. An angle between the final feature vector and a class vector of each of at least one class may be acquired from the final feature vector by the first neural network. A margin may be calculated based on a class angle between a first class vector of the first class and a second class vector of a second class and a feature angle between the first class vector and the final feature vector. A confidence of the training image may be calculated based on the margin, the intermediate feature vector and at least one class vector by the second neural network. The first neural network and the second neural network may be trained based on a loss value calculated using a loss function that includes an angle with the margin applied to the feature angle.

Figure 11:
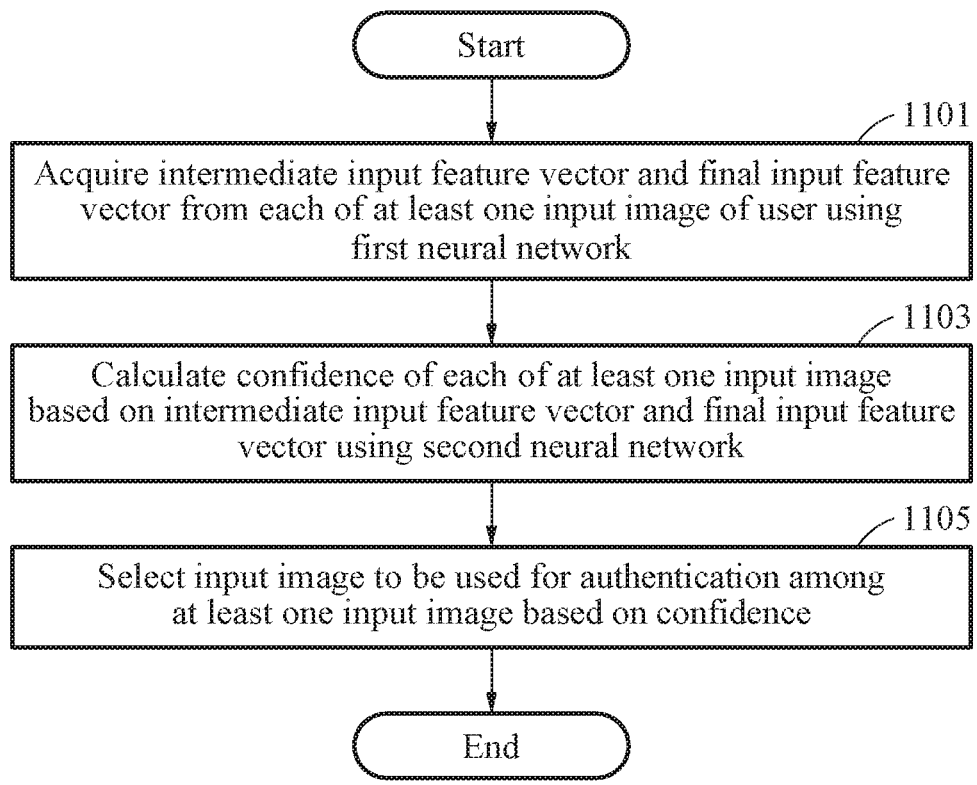
FIG. 11 illustrates an example of an authentication method.

FIG. 11 illustrates an example of an authentication method.

Referring to FIG. 11, in operation 1101, an authentication apparatus may acquire an intermediate input feature vector and a final input feature vector from each of at least one input image of a user using a first neural network.

In operation 1103, the authentication apparatus may calculate a confidence of each of the at least one input image based on the intermediate input feature vector and the final input feature vector using a second neural network.

In operation 1105, the authentication apparatus may select an input image to be used for an authentication among the at least one input image based on the confidence.

In an example, the authentication apparatus may authenticate a user based on the selected input image.

In an example, an intermediate feature vector and a final feature vector may be acquired from a training image belonging to a first class by the first neural network. An angle between the final feature vector and a class vector of each of at least one class may be acquired from the final feature vector by the first neural network. A margin may be calculated based on a class angle between a first class vector of the first class and a second class vector of a second class and a feature angle between the first class vector and the final feature vector. A confidence of the training image may be calculated based on the margin, the intermediate feature vector and at least one class vector by the second neural network. The first neural network and the second neural network may be trained based on a loss value calculated using a loss function that includes an angle with the margin applied to the feature angle.

Figure 12:
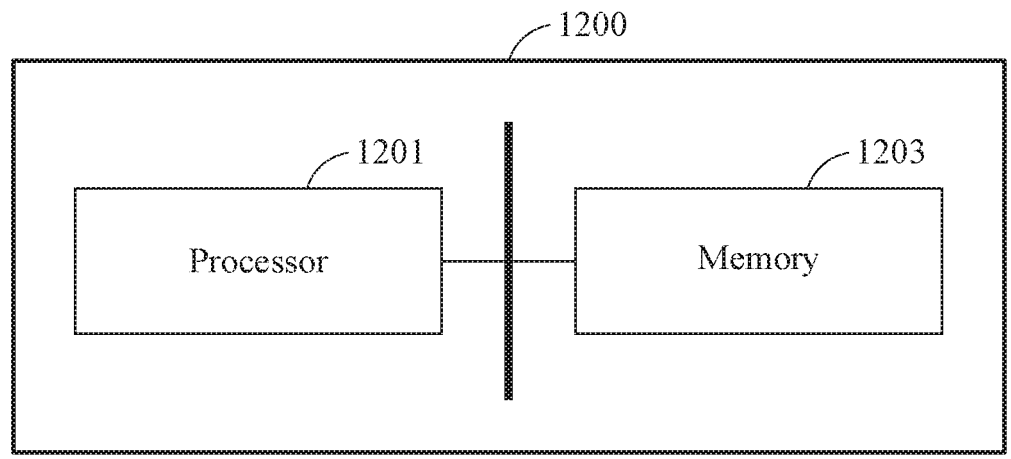
FIG. 12 illustrates an example of a training apparatus.

FIG. 12 illustrates an example of a training apparatus (e.g., a training apparatus 1200).

In an example, the training apparatus 1200 may include at least one processor 1201, and at least one memory 1203 configured to store a neural network.

In this example, the processor 1201 may acquire a feature vector from a training image belonging to a first class using a neural network. The processor 1201 may acquire an angle between the feature vector and a class vector of each of at least one class from the feature vector using the neural network. The processor 1201 may calculate a margin based on a class angle between a first class vector of the first class and a second class vector of a second class and a feature angle between the first class vector and the feature vector. The processor 1201 may calculate a loss value using a loss function that includes an angle with the margin applied to the feature angle. The processor 1201 may update parameters of the neural network or at least one class vector based on the loss value.

In another example, the training apparatus 1200 may include at least one processor 1201, and at least one memory 1203 configured to store a first neural network and a second neural network.

In this example, the processor 1201 may acquire an intermediate feature vector and a final feature vector from a training image belonging to a first class using the first neural network. The processor 1201 may acquire an angle between the final feature vector and a class vector of each of at least one class from the final feature vector using the first neural network. The processor 1201 may calculate a margin based on a class angle between a first class vector of the first class and a second class vector of a second class and a feature angle between the first class vector and the final feature vector. The processor 1201 may calculate a confidence of the training image based on the margin, the intermediate feature vector and at least one class vector using the second neural network. The processor 1201 may calculate a loss value using a loss function that includes an angle with the margin applied to the feature angle. The processor 1201 may update first parameters of the first neural network, second parameters of the second neural network or the at least one class vector, based on the loss value.

Figure 13:
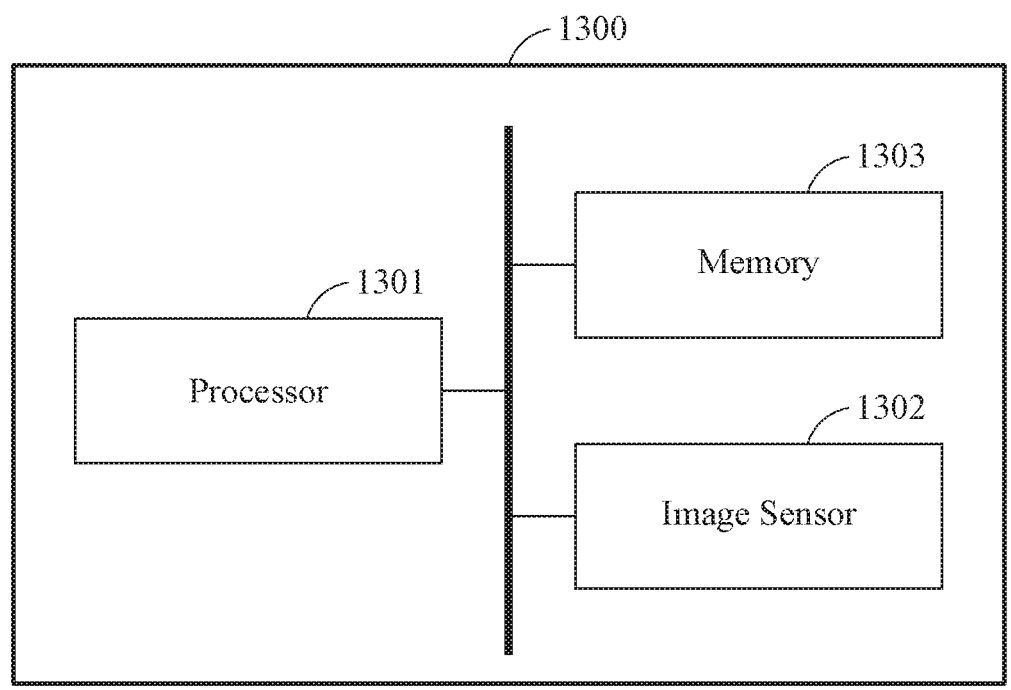
FIG. 13 illustrates an example of an authentication apparatus.

FIG. 13 illustrates an example of an authentication apparatus (e.g., an authentication apparatus 1300).

In an example, the authentication apparatus 1300 may include at least one processor 1301, at least one image sensor 1302, and at least one memory 1303 configured to store a neural network.

In this example, the image sensor 1302 (e.g., an optic sensor such as a camera) may acquire or capture an input image of a user, and the processor 1301 may acquire or determine an input feature vector based on the input image using the neural network. The input feature vector may be compared to an enrolled feature vector of an enrolled image acquired using the neural network. The processor 1301 may authenticate the user based on a comparison result.

Also, a feature vector may be acquired from a training image belonging to a first class by the neural network. An angle between the feature vector and a class vector of each of at least one class may be acquired from the feature vector by the neural network. A margin may be calculated based on a class angle between a first class vector of the first class and a second class vector of a second class and a feature angle between the first class vector and the feature vector. A parameter of the neural network or at least one class vector may be trained based on a loss value calculated using a loss function that includes an angle with the margin applied to the feature angle.

The neural network may include a preceding layer and a feature extractor. The feature extractor may include at least one layer of the neural network. The preceding layer and the feature extractor may be included in a single neural network of the neural network, or may be configured as separate components.

In addition, or as an alternative, the authentication apparatus 1300 may include the at least one processor 1301, and the memory 1303 configured to store a first neural network and a second neural network.

In an example, the processor 1301 may acquire an intermediate input feature vector and a final input feature vector from an input image of a user using the first neural network. The processor 1301 may calculate a confidence of the input image based on the intermediate input feature vector and the final input feature vector using the second neural network.

In another example, the processor 1301 may select an input image to be used for an authentication among at least one input image acquired or captured by the image sensor 1302, based on a confidence. The processor 1301 may authenticate the user based on the selected input image.

In an example, an intermediate feature vector and a final feature vector may be acquired from a training image belonging to a first class by the first neural network. An angle between a final feature vector and a class vector of each of at least one class may be acquired from the final feature vector by the first neural network. A margin may be calculated based on a class angle between a first class vector of the first class and a second class vector of a second class and a feature angle between the first class vector and the final feature vector. A confidence of the training image may be calculated based on the margin, the intermediate feature vector and at least one class vector by the second neural network. The first neural network and the second neural network may be trained based on a loss value calculated using a loss function that includes an angle with the margin applied to the feature angle.

A neural network may include a preceding layer, an intermediate layer, a feature extractor, and a confidence calculator. The intermediate layer, the feature extractor and the confidence calculator each include at least one layer of the neural network. The preceding layer, the intermediate layer, the feature extractor, and the confidence calculator may be included in a single neural network, or may be configured as separate components.

The authentication apparatus 1300 may calculate a confidence of each input image and perform a user authentication based on input images with relatively high confidences, to further enhance a confidence of an authentication result.

The authentication apparatuses, training apparatuses, feature extractors, classifiers, margin calculators, loss value calculators, confidence calculators, processors, memories, image sensors, authentication apparatus 105, feature extractor 305, classifier 307, margin calculator 309, loss value calculator 311, feature extractor 905, classifier 907, margin calculator 909, loss value calculator 911, confidence calculator 927, training apparatus 1200, processor 1201, memory 1203, authentication apparatus 1300, processor 1301, image sensor 1302, memory 1303, apparatuses, units, modules, devices, and other components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network method comprising:
   determining, using a neural network, a feature vector based on a training image of a first class among a plurality of classes;
   determining, using the neural network, plural feature angles between the feature vector and class vectors of other classes among the plurality of classes;
   determining a margin based on a class angle between a first class vector of the first class and a second class vector of a second class, among the class vectors, and a feature angle between the feature vector and the first class vector;

determining a loss value using a loss function including an angle with the margin applied to the feature angle and the plural feature angles; and training the neural network by updating, based on the loss value, either one or both of one or more parameters of the neural network and one or more of the class vectors.

2. The method of claim 1, wherein the determining of the margin comprises determining, as the margin, a ratio of a difference between the class angle and the feature angle to the class angle.

3. The method of claim 1, wherein the loss function comprises a ratio of an exponential value of the angle with the margin applied to the feature angle to a sum of the exponential value and a sum of exponential values of the plural feature angles.

4. The method of claim 3, wherein the exponential value comprises an exponential value of a trigonometric value of the angle with the margin applied to the feature angle.

5. The method of claim 3, wherein the loss function comprises a softmax cross entropy function.

6. The method of claim 1, wherein the training of the neural network by the updating comprises updating the either one or both of the one or more parameters of the neural network and the one or more of the class vectors such that the loss value is reduced.

7. The method of claim 6, wherein the training of the neural network by the updating comprises updating the either one or both of the one or more parameters of the neural network and the one or more of the class vectors such that the feature angle is reduced and the class angle is increased.

8. The method of claim 1, wherein the second class vector has a smallest angle difference with the first class vector among the class vectors of the other classes.

9. A non-transitory computer-readable storage medium storing instructions that, when executed by a processor, configure the processor to perform the method of claim 1.

10. A processor-implemented neural network method comprising:

determining, using a trained neural network, an input feature vector based on an input image of a user;

comparing the input feature vector to an enrolled feature vector of an enrolled image determined using the trained neural network; and authenticating the user based on a result of the comparing, wherein a feature vector is determined, using the neural network, based on a training image of a first class among a plurality of classes, plural feature angles between the feature vector and class vectors of other classes among the plurality of classes are determined using the neural network, a margin is determined based on a class angle between a first class vector of the first class and a second class vector of a second class, among the class vectors, and a feature angle between the feature vector and the first class vector, and the neural network is trained by updating either one or both of one or more parameters of the neural network and one or more of the class vectors based on a loss value determined using a loss function including an angle with the margin applied to the feature angle and the plural feature angles.

11. The method of claim 10, wherein the comparing of the input feature vector to the enrolled feature vector comprises calculating an inner product between the input feature vector and the enrolled feature vector, and the authenticating of the user comprises authenticating the user based on the inner product.

12. The method of claim 10, further comprising capturing the input image of the user using an image sensor.

13. A processor-implemented neural network method comprising:

determining, using a trained first neural network, an intermediate input feature vector and a final input feature vector based on an input image of a user; and determining, using a trained second neural network, a confidence of the input image based on the intermediate input feature vector and the final input feature vector, wherein an intermediate training feature vector and a final training feature vector are determined, using the first neural network, based on a training image of a first class among a plurality of classes, plural feature angles between the final training feature vector and class vectors of other classes among the plurality of classes are determined using the first neural network, a margin is determined based on a class angle between a first class vector of the first class and a second class vector of a second class, among the class vectors, and a feature angle between the final feature vector and the first class vector, a confidence of the training image is determined, using the second neural network, based on the margin, the intermediate training feature vector, and one or more of the class vectors, and the first neural network and the second neural network are trained based on a loss value determined using a loss function including an angle with the margin applied to the feature angle and the plural feature angles.

14. A processor-implemented neural network method comprising:

determining, using a neural network, a feature vector of a training image of a first class among classes;

determining, using the neural network, a feature angle between the feature vector and a first class vector of the first class;

determining a class angle between the first class vector and a second class vector of a second class;

determining a margin based on a ratio of a difference between the class angle and the feature angle to the class angle;

determining a loss value based on the feature angle and the margin; and training the neural network by updating, based on the loss value, one or more of the class vectors.

15. A neural network apparatus comprising:

one or more processors configured to:

determine, using a trained neural network, an input feature vector based on an input image of a user;

compare the input feature vector to an enrolled feature vector of an enrolled image determined using the trained neural network; and authenticate the user based on a result of the comparing, wherein a feature vector is determined, using the neural network, based on a training image of a first class among a plurality of classes, plural feature angles between the feature vector and class vectors of other classes among the plurality of classes are determined using the neural network, a margin is determined based on a class angle between a first class vector of the first class and a second class vector of a second class, among the class vectors, and a feature angle between the feature vector and the first class vector, and the neural network is trained by updating either one or both of one or more parameters of the neural network and one or more of the class vectors based on a loss value determined using a loss function including an angle with the margin applied to the feature angle and the plural feature angles.

* * * * *